United States Patent
Yoshida et al.

(10) Patent No.: US 10,870,735 B2
(45) Date of Patent: Dec. 22, 2020

(54) METHOD FOR PRODUCING LOW MOLECULAR WEIGHT POLYTETRAFLUOROETHYLENE, LOW MOLECULAR WEIGHT POLYTETRAFLUOROETHYLENE, AND POWDER

(71) Applicant: DAIKIN INDUSTRIES, LTD., Osaka (JP)

(72) Inventors: Ken Yoshida, Osaka (JP); Hirotoshi Yoshida, Osaka (JP); Keisuke Hagi, Osaka (JP); Masayuki Tsuji, Osaka (JP); Taketo Kato, Osaka (JP); Yuuji Tanaka, Osaka (JP); Taku Yamanaka, Osaka (JP); Kazuya Kawahara, Osaka (JP); Masamichi Sukegawa, Osaka (JP); Kazutaka Hosokawa, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 18 days.

(21) Appl. No.: 16/069,735

(22) PCT Filed: Aug. 4, 2017

(86) PCT No.: PCT/JP2017/028469
§ 371 (c)(1),
(2) Date: Jul. 12, 2018

(87) PCT Pub. No.: WO2018/026012
PCT Pub. Date: Feb. 8, 2018

(65) Prior Publication Data
US 2019/0023856 A1 Jan. 24, 2019

(30) Foreign Application Priority Data
Aug. 4, 2016 (JP) .................. 2016-153856

(51) Int. Cl.
*C08J 3/12* (2006.01)
*C08J 3/28* (2006.01)
*C08F 8/50* (2006.01)
*C08F 8/06* (2006.01)
*C08F 14/26* (2006.01)

(52) U.S. Cl.
CPC ...... *C08J 3/12* (2013.01); *C08F 8/06* (2013.01); *C08F 8/50* (2013.01); *C08F 14/26* (2013.01); *C08J 3/28* (2013.01); *C08F 2500/07* (2013.01); *C08F 2500/17* (2013.01); *C08F 2800/20* (2013.01); *C08F 2810/40* (2013.01); *C08J 2327/18* (2013.01); *C08J 2327/22* (2013.01)

(58) Field of Classification Search
CPC ..... C08J 3/12; C08J 3/28; C08J 327/22; C08J 2327/18; C08F 8/06; C08F 14/26; C08F 8/50; C08F 2810/40; C08F 2800/20; C08F 2500/07; C08F 2500/17
See application file for complete search history.

(56) References Cited

U.S. PATENT DOCUMENTS

| 3,838,030 A | 9/1974 | Kagiya et al. |
| 4,220,511 A | 9/1980 | Derbyshire |
| 5,891,573 A * | 4/1999 | Neuberg .......... C08J 3/28 428/402 |
| 2003/0153700 A1 | 8/2003 | Wu et al. |
| 2010/0314154 A1 | 12/2010 | Kitahara et al. |
| 2017/0008986 A1 | 1/2017 | Isaka et al. |
| 2019/0023818 A1 | 1/2019 | Yoshida et al. |
| 2019/0040218 A1 | 2/2019 | Ikeda et al. |

FOREIGN PATENT DOCUMENTS

| CN | 102672968 A | 9/2012 |
| EP | 0 253 400 A2 | 1/1988 |
| JP | 47-19609 B1 | 6/1972 |
| JP | 48-78252 A | 10/1973 |
| JP | 50-101450 | 8/1975 |
| JP | 51-3503 B2 | 2/1976 |
| JP | 52-25858 B2 | 7/1977 |
| JP | 52-38870 B2 | 10/1977 |
| JP | 55-124612 A | 9/1980 |
| JP | 63-146908 A | 6/1988 |
| JP | 2-220389 A | 9/1990 |
| JP | 10-77378 A | 3/1998 |

(Continued)

OTHER PUBLICATIONS

Polyflon PTFE F-104, Technical Data Sheet, Daikin, p. 1 (Year: 2015).*
Extended European Search Report dated May 10, 2019 issued by the European Patent Office in counterpart application No. 17837113.4.
International Search Report for related PCT/JP2017/028484 dated Oct. 17, 2017 [PCT/ISA/210].
International Preliminary Report on Patentability with English Translation of the Written Opinion of PCT/JP2017/028469 dated Feb. 5, 2019.

(Continued)

*Primary Examiner* — Jessica M Roswell
(74) *Attorney, Agent, or Firm* — Sughrue Mion, PLLC

(57) ABSTRACT

The invention provides a production method for producing low molecular weight polytetrafluoroethylene enabling easy removal of most of C8-C14 perfluorocarboxylic acids and salts thereof, which are unfortunately generated by irradiation, from the low molecular weight polytetrafluoroethylene. The method for producing low molecular weight polytetrafluoroethylene includes: (1) irradiating polytetrafluoroethylene to provide low molecular weight polytetrafluoroethylene having a melt viscosity of $1 \times 10^2$ to $7 \times 10^5$ Pa·s at 380° C.; (2) pulverizing the low molecular weight polytetrafluoroethylene; and (3) heating the low molecular weight polytetrafluoroethylene pulverized in the step (2).

4 Claims, No Drawings

(56) References Cited

FOREIGN PATENT DOCUMENTS

| JP | 10-147617 | A | 6/1998 |
| JP | 2001-513579 | A | 9/2001 |
| JP | 2002-531645 | A | 9/2002 |
| JP | 4202595 | B2 | 12/2008 |
| WO | 99/07549 | A1 | 2/1999 |
| WO | 00/34300 | A1 | 6/2000 |

OTHER PUBLICATIONS

International Preliminary Report on Patentability with English Translation of the Written Opinion of PCT/JP2017/028484 dated Feb. 5, 2019.
International Search Report for PCT/JP2017/028469 dated Oct. 17, 2017 [PCT/ISA/210].
Communication dated May 10, 2019, from the European Patent Office in related European Application No. 17837118.3.
Office Action dated May 24, 2019 from the United States Patent and Trademark Office in co-pending U.S. Appl. No. 16/069,052.
Notice of Allowance dated Sep. 10, 2019 from the United States Patent and Trademark Office in U.S. Appl. No. 16/069,052.
Office Action dated Mar. 30, 2020 from the United States Patent and Trademark Office in related U.S. Appl. No. 16/696,970.
Fusso Jushi Handobukku, "Fluororesin Handbook", edited by Technical Board and Environmental Board of Japan, Fluoropolymers Industry Association, 10th edition revised, Japan Fluoropolymers Industry Association, Dec. 2004, p. 7 (3 pages total).
Extended European Search Report dated Jun. 23, 2020, from the European Patent Office in counterpart divisional Application No. 19217503.2.
Shen Guang-Iai et al., "Radiation Effect on Polytetrafluoroethylene Studied by ESR", Chinese Journal of Magnetic Resonance, vol. 28, No. 4, Dec. 2011 (13 pages total).

\* cited by examiner

METHOD FOR PRODUCING LOW MOLECULAR WEIGHT POLYTETRAFLUOROETHYLENE, LOW MOLECULAR WEIGHT POLYTETRAFLUOROETHYLENE, AND POWDER

CROSS REFERENCE TO RELATED APPLICATIONS

This application is a National Stage of International Application No. PCT/JP2017/028469, filed on Aug. 4, 2017, which claims priority from Japanese Patent Application No. 2016-153856, filed on Aug. 4, 2016.

TECHNICAL FIELD

The invention relates to methods for producing low molecular weight polytetrafluoroethylene, low molecular weight polytetrafluoroethylene, and powder.

BACKGROUND ART

Low molecular weight polytetrafluoroethylene (also referred to as "polytetrafluoroethylene wax" or "polytetrafluoroethylene micro powder") having a molecular weight of several thousands to several hundreds of thousands has excellent chemical stability and a very low surface energy, as well as low fibrillatability. Thus, low molecular weight polytetrafluoroethylene is used as an additive for improving the smoothness and the texture of film surfaces in production of articles such as plastics, inks, cosmetics, coatings, and greases (for example, see Patent Literature 1).

Examples of known methods for producing low molecular weight polytetrafluoroethylene include polymerization, radiolysis, and pyrolysis.

With regard to the radiolysis among these techniques, Patent Literature 2 discloses a method for producing polytetrafluoroethylene powder having an average particle size of 200 micrometers or smaller, including irradiating polytetrafluoroethylene powder or a preformed article or article thereof with ionizing radiation of at least $5 \times 10^5$ röntgen, and then pulverizing the irradiated article.

Patent Literature 3 discloses a method for disintegrating polytetrafluoroethylene resin, including irradiating polytetrafluoroethylene resin with ionizing radiation in the presence of an oxygen component, heating the irradiated resin, and mechanically pulverizing the heated resin.

Patent Literature 4 discloses a method for finely powdering polytetrafluoroethylene resin, including irradiating polytetrafluoroethylene resin with ionizing radiation in the presence of an oxygen component, heating the irradiated resin in the presence of halogenated methane and the oxygen component together, and then mechanically pulverizing the heated resin.

CITATION LIST

Patent Literature

Patent Literature 1: JP H10-147617 A
Patent Literature 2: JP S47-19609 B
Patent Literature 3: JP S51-3503 B
Patent Literature 4: JP S52-25858 B

SUMMARY OF INVENTION

Technical Problem

The inventors found that irradiation under conventional conditions unfortunately generates short-chain perfluorocarboxylic acids or salts thereof. The short-chain perfluorocarboxylic acids and salts thereof include non-naturally occurring, difficult-to-decompose substances which are further indicated to have high bioaccumulation, i.e., perfluorooctanoic acid containing 8 carbon atoms and salts thereof, perfluorononanoic acid containing 9 carbon atoms and salts thereof, and perfluorodecanoic acid, perfluoroundecanoic acid, perfluorododecanoic acid, perfluorotridecanoic acid, and perfluorotetradecanoic acid respectively containing 10, 11, 12, 13, and 14 carbon atoms and salts thereof.

In view of the above current state of the art, the invention aims to provide a method for producing low molecular weight polytetrafluoroethylene enabling easy removal of most of C8-C14 perfluorocarboxylic acids and salts thereof, which are unfortunately generated by irradiation, from the low molecular weight polytetrafluoroethylene.

Solution to Problem

The invention relates to a method for producing low molecular weight polytetrafluoroethylene, including: (1) irradiating polytetrafluoroethylene to provide low molecular weight polytetrafluoroethylene having a melt viscosity of $1 \times 10^2$ to $7 \times 10^5$ Pa·s at 380° C.; (2) pulverizing the low molecular weight polytetrafluoroethylene; and (3) heating the low molecular weight polytetrafluoroethylene pulverized in the step (2).

The heating is preferably performed at a temperature of 50° C. to 300° C.

The heating is also preferably performed at a temperature of 50° C. to 200° C.

The polytetrafluoroethylene preferably has a standard specific gravity of 2.130 to 2.230.

Both the polytetrafluoroethylene and the low molecular weight polytetrafluoroethylene are preferably in the form of powder.

The production method preferably further includes (4) heating the polytetrafluoroethylene up to a temperature that is not lower than the primary melting point thereof to provide a molded article before the step (1), the molded article having a specific gravity of 1.0 g/cm³ or higher.

The invention also relates to low molecular weight polytetrafluoroethylene obtainable by the above production method.

The invention also relates to powder containing low molecular weight polytetrafluoroethylene, the low molecular weight polytetrafluoroethylene having a melt viscosity of $1 \times 10^2$ to $7 \times 10^5$ Pa·s at 380° C., having an average particle size of 1.0 to 50 μm, and containing 30 or more carboxyl groups at ends of the molecule chain per $10^6$ carbon atoms in the main chain, the powder being substantially free from C8-C14 perfluorocarboxylic acids and salts thereof.

The powder preferably satisfies that the perfluorocarboxylic acids and salts thereof amount to less than 25 ppb.

The powder preferably has a specific surface area of 0.5 to 20 m²/g.

The powder also preferably has a specific surface area of 7.0 to 20 m²/g.

Advantageous Effects of Invention

The production method of the invention enables easy removal of most of C8-C14 perfluorocarboxylic acids and salts thereof, which are unfortunately generated by irradiation, from low molecular weight polytetrafluoroethylene.

DESCRIPTION OF EMBODIMENTS

The invention will be specifically described hereinbelow.

The production method of the invention includes: (1) irradiating polytetrafluoroethylene (PTFE) to provide low molecular weight PTFE having a melt viscosity of $1\times10^2$ to $7\times10^5$ Pa·s at 380° C.; (2) pulverizing the low molecular weight PTFE; and (3) heating the low molecular weight PTFE pulverized in the step (2).

In the step (1), the PTFE can be irradiated by a conventionally known method under conventionally known conditions. Irradiation of the PTFE under conventional irradiating conditions generates low molecular weight PTFE having a higher melt viscosity than the PTFE, as well as C8-C14 perfluorocarboxylic acids and salts thereof. Such perfluorocarboxylic acids and salts thereof can be removed from the low molecular weight PTFE by pulverizing the low molecular weight PTFE and then heating the pulverized low molecular weight PTFE after the irradiation.

Examples of the radiation include any ionizing radiation, such as electron beams, ultraviolet rays, gamma rays, X-rays, neutron beams, and high energy ions. Electron beams or gamma rays are preferred.

The radiation preferably has an exposure dose of 1 to 2500 kGy, more preferably 1000 kGy or lower, still more preferably 750 kGy or lower, while more preferably 10 kGy or higher, still more preferably 100 kGy or higher.

The irradiation temperature may be any temperature within the range of 5° C. to the melting point of PTFE. It is known that the molecule chain of PTFE is crosslinked around the melting point thereof. The irradiation temperature is therefore preferably 320° C. or lower, more preferably 300° C. or lower, still more preferably 260° C. or lower, in order to provide low molecular weight PTFE. From an economic viewpoint, the irradiation is preferably performed at room temperature.

In the step (1), the irradiation may be performed in any atmosphere, such as in the air, inert gas, or vacuum. In order to reduce the cost, the irradiation is preferably performed in the air. In order to reduce generation of C8-C14 perfluorocarboxylic acids and salts thereof, the irradiation is preferably performed substantially in the absence of oxygen. It should be noted that irradiation substantially in the absence of oxygen is not essential because the production method of the invention includes the pulverization and the heating after the irradiation.

The step (1) preferably provides particles of the low molecular weight PTFE having an average particle size of 500 μm or smaller. The average particle size of the low molecular weight PTFE particles is more preferably 300 μm or smaller, still more preferably 100 μm or smaller. The lower limit thereof may be, but is not limited to, greater than 30 μm. Low molecular weight PTFE particles having an average particle size within the above range can easily provide powder of low molecular weight PTFE having a relatively small average particle size.

The average particle size is equivalent to the particle size corresponding to 50% of the cumulative volume in the particle size distribution determined using a laser diffraction particle size distribution analyzer (HELOS & RODOS) available from Jeol Ltd. at a dispersive pressure of 1.0 bar without cascade impaction.

The pulverization in the step (2) may be performed by any method, such as pulverization using a pulverizer. Examples of the pulverizer include impact-type pulverizers such as hammer mills, pin mills, and jet mills, and grinding-type pulverizers utilizing shearing force generated by unevenness between a rotary blade and a peripheral stator, such as cutter mills.

The pulverization temperature is preferably not lower than −200° C. but lower than 50° C. In the case of freeze pulverization, the pulverization temperature is usually −200° C. to −100° C. Still, the pulverization may be performed around room temperature (10° C. to 30° C.). Freeze pulverization is usually achieved by the use of liquid nitrogen, but such pulverization requires enormous equipment and high pulverization cost. In order to simplify the step and reduce the pulverization cost, the pulverization temperature is more preferably not lower than 10° C. but lower than 50° C., still more preferably 10° C. to 40° C., particularly preferably 10° C. to 30° C.

The pulverization may be followed by removal of particles and fibrous particles by air classification, and further followed by removal of coarse particles by classification.

In the air classification, the pulverized particles are sent to a cylindrical classification chamber by decompressed air, dispersed by swirl flow inside the chamber, and classified by centrifugal force. The particles are collected from the central portion into a cyclone and a bag filter. Inside the classification chamber is provided a rotary device such as a circular-cone-like cone or rotor configured to achieve homogeneous gyrating movement of the pulverized particles and the air.

In the case of using a classification cone, the classification point is adjusted by controlling the volume of the secondary air or the gap from the classification cone. In the case of using a rotor, the air volume inside the classification chamber is adjusted by the number of rotations of the rotor.

Examples of the method of removing coarse particles include air classification, vibration sieving with meshes, and ultrasonic sieving with meshes. Air classification is preferred.

The step (2) provides pulverized particles of the low molecular weight PTFE having a smaller average particle size than the low molecular weight PTFE particles obtained in the step (1). Preferably, the pulverized particles of the low molecular weight PTFE have an average particle size of 1 to 200 μm. The average particle size of the pulverized particles of the low molecular weight PTFE is more preferably 100 μm or smaller, and may be 1.0 to 50 μm. Pulverized particles of the low molecular weight PTFE having an average particle size within the above range can easily provide powder of low molecular weight PTFE having a relatively small average particle size.

The average particle size is equivalent to the particle size corresponding to 50% of the cumulative volume in the particle size distribution determined using a laser diffraction particle size distribution analyzer (HELOS & RODOS) available from Jeol Ltd. at a dispersive pressure of 1.0 bar without cascade impaction.

The heating in the step (3) is preferably performed at a temperature higher than the pulverization temperature in the step (2), and is preferably performed at 50° C. to 300° C., for example. The heating temperature is more preferably 70° C. or higher, still more preferably 90° C. or higher, particularly preferably 100° C. or higher, while more preferably 230° C.

or lower, still more preferably 200° C. or lower, particularly preferably 130° C. or lower. Too low a heating temperature may cause insufficient removal of C8-C14 perfluorocarboxylic acids and salts thereof. Too high a heating temperature may cause disadvantages such as a failure in achieving effects that correspond to the energy required for the heating, agglomeration of powder, and deformation of particles.

The heating may be performed for any duration, and the heating duration is preferably 10 seconds to 5 hours, more preferably 5 minutes or longer, still more preferably 10 minutes or longer, while more preferably 4 hours or shorter, still more preferably 3 hours or shorter. Too short a heating duration may cause insufficient removal of C8-C14 perfluorocarboxylic acids and salts thereof. Too long a heating duration may cause disadvantages such as a failure in achieving effects that correspond to the heating duration, agglomeration of powder, and deformation of particles.

The heating may be performed by any method, such as methods using any of the following heating devices. Examples of the heating devices include box dryers, band dryers, tunnel dryers, nozzle jet dryers, moving-bed dryers, rotary dryers, fluidized-bed dryers, air-flow dryers, box dryers, disc dryers, cylindrical mixing dryers, inverted-cone mixing dryers, microwave devices, vacuum heaters, box electric furnaces, hot-air circulating devices, flash dryers, vibration dryers, belt dryers, extrusion dryers, and spray dryers.

In the step (3), the heating may be performed in any atmosphere. From the viewpoints of safety and economy, the heating is preferably performed in the air.

In the step (3), the heating may be performed by placing the low molecular weight PTFE in a heating furnace, increasing the temperature inside the heating furnace up to a predetermined temperature, and then leaving the PTFE for a predetermined period of time.

As described above, the low molecular weight PTFE is heated after the pulverization in the production method of the invention. Thus, most of C8-C14 perfluorocarboxylic acids and salts thereof unfortunately generated during the irradiation can be removed from the low molecular weight PTFE. If the order of the pulverization and the heating is reversed, C8-C14 perfluorocarboxylic acids and salts thereof cannot be sufficiently removed.

The production method of the invention may further include (4) heating the PTFE up to a temperature that is not lower than the primary melting point thereof to provide a molded article before the step (1). In this case, the molded article obtained in the step (4) can be used as the PTFE in the step (1). The primary melting point is preferably 300° C. or higher, more preferably 310° C. or higher, still more preferably 320° C. or higher. The primary melting point means the maximum peak temperature on an endothermic curve present on the crystal melting curve when unsintered PTFE is analyzed with a differential scanning calorimeter. The endothermic curve is obtainable by increasing the temperature at a temperature-increasing rate of 10° C./min using a differential scanning calorimeter.

The molded article in the step (4) preferably has a specific gravity of 1.0 g/cm$^3$ or higher, more preferably 1.5 g/cm$^3$ or higher, while preferably 2.5 g/cm$^3$ or lower.

The specific gravity can be determined by water displacement.

The production method of the invention may further include pulverizing the molded article to provide powder of the PTFE after the step (4). The molded article may be first coarsely and then finely pulverized.

The production method of the invention may further include (5) pulverizing the low molecular weight PTFE heated in the step (3). This can easily provide powder of low molecular weight PTFE having a much smaller average particle size.

Next, the PTFE to be irradiated and the low molecular weight PTFE to be obtained after the irradiation in the production method of the invention are described hereinbelow.

The low molecular weight PTFE has a melt viscosity of $1\times10^2$ to $7\times10^5$ Pa·s at 380° C. The term "low molecular weight" herein means that the melt viscosity is within this range.

The melt viscosity is a value determined by heating a 2-g sample at 380° C. for five minutes in advance and then keeping this sample at this temperature under a load of 0.7 MPa using a flow tester (Shimadzu Corp.) and a 2ϕ-8L die in conformity with ASTM D1238.

The PTFE to be irradiated preferably has a standard specific gravity (SSG) of 2.130 to 2.230. The standard specific gravity (SSG) is a value determined in conformity with ASTM D4895.

The PTFE has a significantly higher melt viscosity than the low molecular weight PTFE, and thus the melt viscosity thereof is difficult to measure accurately. In contrast, the melt viscosity of the low molecular weight PTFE is measurable, but the low molecular weight PTFE has difficulty in providing a molded article usable for measurement of standard specific gravity. Thus, the standard specific gravity thereof is difficult to measure accurately. Therefore, in the invention, the standard specific gravity is used as an indicator of the molecular weight of the PTFE to be irradiated, while the melt viscosity is used as an indicator of the molecular weight of the low molecular weight PTFE. For both the PTFE and the low molecular weight PTFE, no method for determining the molecular weight directly has been known so far.

The low molecular weight PTFE preferably has a melting point of 324° C. to 336° C.

The melting point is defined using a differential scanning calorimeter (DSC) as follows. Specifically, temperature calibration is performed in advance with indium and lead as standard samples. Then, about 3 mg of low molecular weight PTFE is put into an aluminum pan (crimped container), and the temperature is increased at a rate of 10° C./min within the temperature range of 250° C. to 380° C. under air flow at 200 ml/min. The minimum point of the heat of fusion within this region is defined as the melting point.

In the production method of the invention, the PTFE may be in any form, such as powder, a molded article of the PTFE, or shavings generated by cutting the molded article of the PTFE. The PTFE in the form of powder can easily provide powder of the low molecular weight PTFE.

The low molecular weight PTFE obtainable by the production method of the invention may be in any form, and is preferably in the form of powder.

When the low molecular weight PTFE obtainable by the production method of the invention is in the form of powder, the specific surface area thereof is preferably 0.5 to 20 m$^2$/g. The specific surface area is more preferably 7.0 m$^2$/g or larger.

For the low molecular weight PTFE powder, both of the following two types are demanded, i.e., a small specific surface area type having a specific surface area of not smaller than 0.5 m$^2$/g but smaller than 7.0 m$^2$/g and a large specific surface area type having a specific surface area of not smaller than 7.0 m$^2$/g and not larger than 20 m$^2$/g.

The low molecular weight PTFE powder of a small specific surface area type has an advantage of easy dispersion in a matrix material such as coating. In contrast, such powder disperses in a matrix material with a large dispersed particle size, i.e., with poor fine dispersibility.

The low molecular weight PTFE powder of a small specific surface area type preferably has a specific surface area of 1.0 m$^2$/g or larger, while preferably 5.0 m$^2$/g or smaller, more preferably 3.0 m$^2$/g or smaller. Suitable examples of the matrix material include plastics and inks, as well as coatings.

The low molecular weight PTFE powder of a large specific surface area type, when dispersed in a matrix material such as coating, has advantages of high surface-modifying effects, such as a small dispersed particle size in a matrix material and improved texture of the film surface, and a large amount of oil absorption. In contrast, such powder may not be easily dispersed in a matrix material (e.g., take a long time for dispersion), and may cause an increased viscosity of coating, for example.

The low molecular weight PTFE powder of a large specific surface area type preferably has a specific surface area of 8.0 m$^2$/g or larger, while preferably 15 m$^2$/g or smaller, more preferably 13 m$^2$/g or smaller. Suitable examples of the matrix material include oils, greases, and coatings, as well as plastics.

The specific surface area is determined by the BET method using a surface analyzer (trade name: BELSORP-mini II, MicrotracBEL Corp.), a gas mixture of 30% nitrogen and 70% helium as carrier gas, and liquid nitrogen for cooling.

When the low molecular weight PTFE obtainable by the production method of the invention is in the form of powder, the average particle size thereof is preferably 0.5 to 200 μm, more preferably 50 μm or smaller, still more preferably 20 μm or smaller, particularly preferably 10 μm or smaller, further more preferably 5 μm or smaller. The lower limit thereof may be 1.0 μm. As mentioned here, powder having a relatively small average particle size, when used as an additive for coating, for example, can provide a film having much better surface smoothness.

The average particle size is equivalent to the particle size corresponding to 50% of the cumulative volume in the particle size distribution determined using a laser diffraction particle size distribution analyzer (HELOS & RODOS) available from Jeol Ltd. at a dispersive pressure of 1.0 bar without cascade impaction.

The production method of the invention can provide low molecular weight PTFE containing hardly any C8-C14 perfluorocarboxylic acids and salts thereof after the step (3). The low molecular weight PTFE obtainable by the production method of the invention preferably contains C8-C14 perfluorocarboxylic acids and salts thereof in a total amount by mass of not more than 50 ppb, more preferably less than 25 ppb, still more preferably not more than 15 ppb, particularly preferably not more than 5 ppb, most preferably less than 5 ppb. The lower limit of the amount may be any value, and may be lower than the detection limit.

The amount of the perfluorocarboxylic acids and salts thereof can be determined by liquid chromatography.

The low molecular weight PTFE obtainable by the production method of the invention is also characterized in that it contains hardly any perfluorooctanoic acid and salts thereof. The low molecular weight PTFE obtainable by the production method of the invention preferably contains perfluorooctanoic acid and salts thereof in an amount by mass of less than 25 ppb. This amount is more preferably not more than 15 ppb, still more preferably not more than 5 ppb, particularly preferably less than 5 ppb. The lower limit may be any value, and may be lower than the detection limit.

The amount of perfluorooctanoic acid and salts thereof can be determined by liquid chromatography.

The invention also relates to low molecular weight PTFE obtainable by the aforementioned production method. The low molecular weight PTFE of the invention contains hardly any C8-C14 perfluorocarboxylic acids and salts thereof. The low molecular weight PTFE of the invention preferably contains C8-C14 perfluorocarboxylic acids and salts thereof in a total amount by mass of not more than 50 ppb, more preferably less than 25 ppb, still more preferably not more than 15 ppb, particularly preferably not more than 5 ppb, most preferably less than 5 ppb. The lower limit thereof may be any value, and may be lower than the detection limit.

The low molecular weight PTFE of the invention preferably contains perfluorooctanoic acid and salts thereof in an amount by mass of less than 25 ppb, more preferably not more than 15 ppb, still more preferably not more than 5 ppb, particularly preferably less than 5 ppb. The lower limit thereof may be any value, and may be lower than the detection limit.

The low molecular weight PTFE of the invention may be in any form, and is preferably in the form of powder.

When the low molecular weight PTFE of the invention is in the form of powder, the specific surface area thereof is preferably 0.5 to 20 m$^2$/g. The specific surface area is more preferably 7.0 m$^2$/g or larger.

When the low molecular weight PTFE of the invention is in the form of powder, the average particle size thereof is preferably 1.0 to 200 μm, more preferably 20 m or smaller, still more preferably 10 μm or smaller, particularly preferably 5 μm or smaller. As mentioned here, powder having a relatively small average particle size, when used as an additive for coating, for example, can provide a film having much better surface smoothness.

The low molecular weight PTFE preferably contains 30 or more carboxyl groups at ends of the molecule chain per 10$^6$ carbon atoms in the main chain. The number of carboxyl groups is more preferably 35 or more per 10$^6$ carbon atoms in the main chain. The upper limit of the number of carboxyl groups may be any value, and is preferably 500, more preferably 350, per 10$^6$ carbon atoms in the main chain, for example. The carboxyl groups may be generated at ends of the molecule chain of the low molecular weight PTFE by the aforementioned irradiation of the PTFE in the presence of oxygen, for example. The number of carboxyl groups after irradiation increases in accordance with the amount of modification in the PTFE. As the low molecular weight PTFE contains 30 or more carboxyl groups at ends of the molecule chain per 10$^6$ carbon atoms in the main chain, it can have excellent dispersibility in molding materials, inks, cosmetics, coatings, greases, components for office automation devices, toner-modifying additives, additives for plating solutions, and others. For example, micro powder is blended into hydrocarbon-based matrix resins, inks, and coatings for the purpose of improving the slidability, reducing the abrasion loss, preventing squeal, and improving the water and oil repellency. However, such micro powder, which is a perfluororesin, is originally poor in compatibility with matrix resins, inks, and coatings, and thus is difficult to disperse uniformly. In contrast, micro powder produced by irradiating and decomposing high molecular weight PTFE generates perfluorooctanoic acid (PFOA) and salts thereof and carboxyl groups as by-products due to the production method thereof. Carboxyl groups present at ends and other positions in the resulting micro powder consequently act as dispersants for hydrocarbon-based matrix resin, inks, and coatings.

The low molecular weight PTFE may contain, at ends of the molecule chain, unstable end groups derived from the chemical structure of a polymerization initiator or chain-transfer agent used in the polymerization reaction of PTFE. Examples of the unstable end groups include, but are not limited to, —CH$_2$OH, —COOH, and —COOCH$_3$.

The low molecular weight PTFE may undergo stabilization of the unstable end groups. The unstable end groups may be stabilized by any method, such as a method of exposing the unstable end groups to fluorine-containing gas to convert them into trifluoromethyl groups (—CF$_3$), for example.

The low molecular weight PTFE may contain amidated ends. The end amidation may be performed by any method, such as a method of bringing fluorocarbonyl groups (—COF) obtained by exposure to fluorine-containing gas into contact with ammonia gas as disclosed in JP H04-20507 A, for example.

The low molecular weight PTFE with stabilization or end amidation of the unstable end groups as described above can be well compatible with opposite materials and have improved dispersibility when used as an additive for opposite materials such as coatings, greases, cosmetics, plating solutions, toners, and plastics.

The PTFE may be a homo-PTFE consisting only of a tetrafluoroethylene (TFE) unit or may be a modified PTFE containing a TFE unit and a modifying monomer unit based on a modifying monomer copolymerizable with TFE. In the production method of the invention, the composition of the polymer is not changed. Thus, the low molecular weight PTFE has the composition of the PTFE as it is.

In the modified PTFE, the proportion of the modifying monomer unit is preferably 0.001 to 1 mass %, more preferably 0.01 mass % or more, while more preferably 0.5 mass % or less, still more preferably 0.1 mass % or less, of all the monomer units. The term "modifying monomer unit" herein means a moiety that is part of the molecular structure of the modified PTFE and is derived from a modifying monomer. The term "all the monomer units" herein means all the moieties derived from monomers in the molecular structure of the modified PTFE. The proportion of the modifying monomer unit can be determined by any known method such as Fourier transform infrared spectroscopy (FT-IR).

The modifying monomer may be any one copolymerizable with TFE, and examples thereof include perfluoroolefins such as hexafluoropropylene (HFP); chlorofluoroolefins such as chlorotrifluoroethylene (CTFE); hydrogen-containing fluoroolefins such as trifluoroethylene and vinylidene fluoride (VDF); perfluorovinyl ether; perfluoroalkylethylenes; and ethylene. One modifying monomer may be used, or multiple modifying monomers may be used.

Examples of the perfluorovinyl ether include, but are not limited to, unsaturated perfluoro compounds represented by the following formula (1):

$$CF_2=CF—ORf \quad (1)$$

wherein Rf is a perfluoroorganic group. The "perfluoroorganic group" herein means an organic group in which all the hydrogen atoms bonded to any carbon atom are replaced by fluorine atoms. The perfluoroorganic group may contain ether oxygen.

Examples of the perfluorovinyl ether include perfluoro(alkyl vinyl ethers) (PAVEs) represented by the formula (1) in which Rf is a C1-C10 perfluoroalkyl group. The perfluoroalkyl group preferably contains 1 to 5 carbon atoms.

Examples of the perfluoroalkyl group in the PAVE include perfluoromethyl, perfluoroethyl, perfluoropropyl, perfluorobutyl, perfluoropentyl, and perfluorohexyl groups. Preferred is perfluoro(propyl vinyl ether) (PPVE) in which the perfluoroalkyl group is a perfluoropropyl group.

Examples of the perfluorovinyl ether also include those represented by the formula (1) in which Rf is a C4-C9 perfluoro(alkoxyalkyl) group, those represented by the formula (1) in which Rf is a group represented by the following formula:

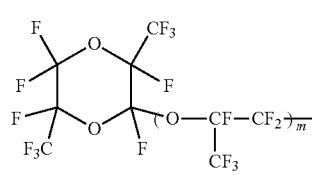

[Chem. 1]

(wherein m is 0 or an integer of 1 to 4), and those represented by the formula (1) in which Rf is a group represented by the following formula:

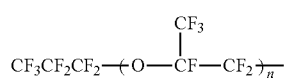

[Chem. 2]

wherein n is an integer of 1 to 4.

Examples of the perfluoroalkylethylenes include, but are not limited to, (perfluorobutyl)ethylene (PFBE), (perfluorohexyl)ethylene, and (perfluorooctyl)ethylene.

The modifying monomer in the modified PTFE is preferably at least one selected from the group consisting of HFP, CTFE, VDF, PPVE, PFBE, and ethylene. It is more preferably at least one selected from the group consisting of PPVE, HFP, and CTFE.

The invention also relates to powder containing low molecular weight PTFE, the low molecular weight PTFE having a melt viscosity of 1×10$^2$ to 7×10$^5$ Pa·s at 380° C., having an average particle size of 1.0 to 50 μm, and containing 30 or more carboxyl groups at ends of the molecule chain per 10$^6$ carbon atoms in the main chain, the powder being substantially free from C8-C14 perfluorocarboxylic acids and salts thereof.

The powder of the invention is substantially free from C8-C14 perfluorocarboxylic acids and salts thereof. The phrase "substantially free from C8-C14 perfluorocarboxylic acids and salts thereof" herein preferably means that the powder contains C8-C14 perfluorocarboxylic acids and salts thereof in a total amount by mass of not more than 50 ppb. The total amount thereof is more preferably less than 25 ppb, still more preferably not more than 15 ppb, particularly preferably not more than 5 ppb, most preferably less than 5 ppb. The lower limit thereof may be any value, and may be lower than the detection limit. The number of carbon atoms may be 10 or less.

The powder of the invention preferably contains perfluorooctanoic acid and salts thereof in a total amount by mass of less than 25 ppb, more preferably not more than 15 ppb, still more preferably not more than 5 ppb, particularly preferably less than 5 ppb. The lower limit thereof may be any value, and may be lower than the detection limit.

The powder of the invention preferably has a specific surface area of 0.5 to 20 m$^2$/g. The specific surface-area is more preferably 7.0 m$^2$/g or larger.

The powder of the invention has an average particle size of 1.0 to 50 µm. The average particle size is preferably 20 µm or smaller, more preferably 10 µm or smaller, still more preferably 5 µm or smaller. As mentioned here, powder having a relatively small average particle size, when used as an additive for coating, for example, can provide a film having much better surface smoothness.

For the low molecular weight PTFE constituting the powder of the invention, the composition, melt viscosity, and specifications of carboxyl groups at ends of the molecule chain are similar to those described for the low molecular weight PTFE obtainable by the production method of the invention.

The low molecular weight PTFE constituting the powder of the invention may contain unstable end groups at ends of the molecule chain, and these unstable end groups may be stabilized, end-amidated, or end-fluorinated. These embodiments are also similar to those described for the low molecular weight PTFE obtainable by the production method of the invention.

The powder of the invention may be obtainable by producing powdery low molecular weight PTFE by the aforementioned production method of the invention.

The low molecular weight PTFE and the powder can suitably be used as molding materials, inks, cosmetics, coatings, greases, components for office automation devices, additives for modifying toners, and additives for plating solutions, for example. Examples of the molding materials include engineering plastics such as polyoxybenzoyl polyester, polyimide, polyamide, polyamide-imide, polyacetal, polycarbonate, and polyphenylene sulfide. The low molecular weight PTFE is particularly suitable as a thickening agent for greases.

The low molecular weight PTFE and the powder can be used as additives for molding materials for improving the non-adhesiveness and slidability of rollers of copiers, for improving the texture of molded articles of engineering plastics, such as surface sheets of furniture, dashboards of automobiles, and covers of home appliances, and for improving the smoothness and abrasion resistance of machine elements generating mechanical friction, such as light-load bearings, gears, cams, buttons of push-button telephones, movie projectors, camera components, and sliding materials.

The low molecular weight PTFE and the powder can be used as additives for coatings for the purpose of improving the smoothness of varnish and paint. The low molecular weight PTFE and the powder can be used as additives for cosmetics for the purpose of improving the smoothness of cosmetics such as foundation.

The low molecular weight PTFE and the powder can also be suitably used for improving the oil or water repellency of wax and for improving the smoothness of greases and toners.

The low molecular weight PTFE and the powder can be used as electrode binders of secondary batteries and fuel cells, hardness adjusters for electrode binders, and water repellents for electrode surfaces.

The low molecular weight PTFE or the powder may be combined with a lubricant to provide grease. The grease is characterized by containing the low molecular weight PTFE or the powder and a lubricant. Thus, the low molecular weight PTFE or the powder is uniformly and stably dispersed in the lubricant and the grease exhibits excellent performance such as load resistance, electric insulation, and low moisture absorption.

The lubricant (base oil) may be either mineral oil or synthetic oil. Examples of the lubricant (base oil) include paraffinic or naphthenic mineral oils, and synthetic oils such as synthetic hydrocarbon oils, ester oils, fluorine oils, and silicone oils. In terms of heat resistance, fluorine oils are preferred. Examples of the fluorine oils include perfluoropolyether oil and polychlorotrifluoroethylene with a low polymerization degree. The polychlorotrifluoroethylene with a low polymerization degree may have a weight average molecular weight of 500 to 1200.

The grease may further contain a thickening agent. Examples of the thickening agent include metal soaps, composite metal soaps, bentonite, phthalocyanin, silica gel, urea compounds, urea/urethane compounds, urethane compounds, and imide compounds. Examples of the metal soaps include sodium soap, calcium soap, aluminum soap, and lithium soap. Examples of the urea compounds, urea/urethane compounds, and urethane compounds include diurea compounds, triurea compounds, tetraurea compounds, other polyurea compounds, urea/urethane compounds, diurethane compounds, and mixtures thereof.

The grease preferably contains the low molecular weight PTFE or the powder in an amount of 0.1 to 50 mass %, more preferably 0.5 mass % or more and 30 mass % or less. A grease containing too large an amount of the low molecular weight PTFE or powder may be too hard to provide sufficient lubrication. A grease containing too small an amount of the low molecular weight PTFE or powder may fail to exert the sealability.

The grease may also contain any of additives such as solid lubricants, extreme pressure agents, antioxidants, oilness agents, anticorrosives, viscosity index improvers, and detergent dispersants.

EXAMPLES

The invention is described below with reference to examples. Still, the invention is not intended to be limited to the following examples.

The parameters in the examples were determined by the following methods.
Average Particle Size The average particle size was defined as the particle size corresponding to 50% of the cumulative volume in the particle size distribution determined using a laser diffraction particle size distribution analyzer (HELOS & RODOS) available from Jeol Ltd. at a dispersive pressure of 1.0 bar without cascade impaction.
Melt Viscosity The melt viscosity was determined by heating a 2-g sample at 380° C. for five minutes in advance and then keeping this sample at this temperature under a load of 0.7 MPa using a flow tester (Shimadzu Corp.) and a 2ϕ-8L die in conformity with ASTM D1238.
Melting Point The melting point was defined using a differential scanning calorimeter (DSC) as follows. Specifically, temperature calibration was performed in advance with indium and lead as standard samples. Then, about 3 mg of low molecular weight PTFE was put into an aluminum pan (crimped container), and the temperature was increased at a rate of 10° C./min within the temperature range of 250° C. to 380° C.

under air flow at 200 ml/min. The minimum point of the heat of fusion within this region was defined as the melting point.
Specific Surface Area The specific surface area was determined by the BET method using a surface analyzer (trade name: BELSORP-mini II, MicrotracBEL Corp.). A gas mixture of 30% nitrogen and 70% helium was used as carrier gas, and liquid nitrogen was used for cooling.

Number of Carboxyl End Groups

The following measurement was performed in conformity with the method of analyzing end groups disclosed in JP H04-20507 A.

Low molecular weight PTFE powder was preformed with a hand press to provide a film having a thickness of about 0.1 mm. The resulting film was subjected to infrared absorption spectrum analysis. PTFE with completely fluorinated ends by contact with fluorine gas was also subjected to infrared absorption spectrum analysis. Based on the difference spectrum therebetween, the number of carboxyl end groups was calculated by the following formula.

Number of carboxyl end groups (per $10^6$ carbon atoms)=$(l \times K)/t$ l: absorbance
K: correction coefficient
t: film thickness (mm)

The absorption frequency and correction coefficient of the carboxyl group are respectively set to 3560 cm$^{-1}$ and 440.
Amount of Perfluorooctanoic Acid and Salts Thereof The amount of perfluorooctanoic acid and salts thereof was determined using a liquid chromatography-mass spectrometer (LC-MS ACQUITY UPLC/TQD, Waters). Measurement powder (1 g) was mixed with acetonitrile (5 ml) and the mixture was sonicated for 60 minutes, so that perfluorooctanoic acid was extracted. The resulting liquid phase was analyzed by multiple reaction monitoring (MRM). Acetonitrile (A) and an aqueous ammonium acetate solution (20 mmol/L) (B) were passed at a predetermined concentration gradient (A/B=40/60 for 2 min and 80/20 for 1 min) as mobile phases. A separation column (ACQUITY UPLC BEH C18 1.7 µm) was used at a column temperature of 40° C. and an injection volume of 5 µL. Electrospray ionization (ESI) in a negative mode was used as the ionization method, and the cone voltage was set to 25 V. The ratio of the molecular weight of precursor ions to the molecular weight of product ions was measured to be 413/369. The amount of perfluorooctanoic acid and salts thereof was calculated by the external standard method. The detection limit of this measurement is 5 ppb.
Amount of C8-C14 Perfluorocarboxylic Acids and Salts Thereof C8-C14 perfluorocarboxylic acids and salts thereof were detected using a liquid chromatography-mass spectrometer (LC-MS ACQUITY UPLC/TQD, Waters). The solution used was the liquid phase extracted in the measurement of perfluorooctanoic acid, and the measurement was performed by MRM. The measurement conditions were based on the measurement conditions for perfluorooctanoic acid, but the concentration gradient was changed (A/B=10/90 for 1.5 min and 90/10 for 3.5 min). The ratio of the molecular weight of precursor ions to the molecular weight of product ions was measured to be 413/369 for perfluorooctanoic acid (C8), 463/419 for perfluorononanoic acid (C9), and 513/469 for perfluorodecanoic acid (C10). In the same manner, the ratio was measured to be 563/519 for perfluoroundecanoic acid (C11), 613/569 for perfluorododecanoic acid (C12), 663/619 for perfluorotridecanoic acid (C13), and 713/669 for perfluorotetradecanoic acid (C14).

The total amount of C8-C14 perfluorocarboxylic acids was calculated from the amount (X) of the perfluorooctanoic acid obtained in the above measurement by the following formula. The detection limit of this measurement is 5 ppb.

$$(A_{C8}+A_{C9}+A_{C10}+A_{C11}+A_{C12}+A_{C13}+A_{C14})/A_{C8} \times X$$

$A_{C8}$: peak area of perfluorooctanoic acid
$A_{C9}$: peak area of perfluorononanoic acid
$A_{C10}$: peak area of perfluorodecanoic acid
$A_{C11}$: peak area of perfluoroundecanoic acid
$A_{C12}$: peak area of perfluorododecanoic acid
$A_{C13}$: peak area of perfluorotridecanoic acid
$A_{C14}$: peak area of perfluorotetradecanoic acid
X: amount of perfluorooctanoic acid calculated from the MRM measurement result by the external standard method Comparative Example 1

Commercially available homo-PTFE fine powder (standard specific gravity measured in conformity with ASTM D4895: 2.175) was irradiated with 150 kGy of cobalt-60 γ-rays at room temperature in the air. Thereby, a low molecular weight PTFE powder A having an average particle size of 51.2 µm was obtained.

The physical properties of the resulting low molecular weight PTFE powder A were determined. The results are shown in Table 1.

For the low molecular weight PTFE powder A, the number of carboxyl end groups was counted by infrared spectroscopy to be 36 groups per $10^6$ carbon atoms in the main chain.

Comparative Example 2

The low molecular weight PTFE powder A obtained in Comparative Example 1 was pulverized using a pulverizer. Thereby, a low molecular weight PTFE powder B having an average particle size of 11.2 µm was obtained.

The physical properties were determined in the same manner as in Comparative Example 1. The results are shown in Table 1.

Comparative Example 3

The low molecular weight PTFE powder A obtained in Comparative Example 1 was heated at 100° C. for 30 minutes using a hot-air-circulating electric furnace (Ultra-high temperature chamber STPH-202M, Espec Corp.). Thereby, a low molecular weight PTFE powder C was obtained.

The physical properties were determined in the same manner as in Comparative Example 1. The results are shown in Table 1.

Comparative Example 4

The low molecular weight PTFE powder C obtained in Comparative Example 3 was pulverized using a pulverizer. Thereby, a low molecular weight PTFE powder D was obtained.

The physical properties were determined in the same manner as in Comparative Example 1. The results are shown in Table 1.

Example 1

The low molecular weight PTFE powder B obtained in Comparative Example 2 was heated at 100° C. for 30 minutes using a hot-air-circulating electric furnace (Ultra-high temperature chamber STPH-202M, Espec Corp.). Thereby, a low molecular weight PTFE powder E was obtained.

The physical properties were determined in the same manner as in Comparative Example 1. The results are shown in Table 1.

Example 2

The low molecular weight PTFE powder E obtained in Example 1 was further pulverized using a pulverizer. Thereby, a low molecular weight PTFE powder F was obtained.

The physical properties were determined in the same manner as in Comparative Example 1. The results are shown in Table 1.

Comparative Example 5

The low molecular weight PTFE powder A obtained in Comparative Example 1 was pulverized using a pulverizer. Thereby, a low molecular weight PTFE powder G having an average particle size of 2.2 μm was obtained.

The physical properties were determined in the same manner as in Comparative Example 1. The results are shown in Table 2.

Examples 3 to 7

The low molecular weight PTFE powder G obtained in Comparative Example 5 was heated under the respective conditions shown in Table 2 using a hot-air-circulating electric furnace (Ultra-high temperature chamber STPH-202M, Espec Corp.). Thereby, low molecular weight PTFE powders H to L were obtained. For the low molecular weight PTFE powders H to L, the physical properties were determined in the same manner as in Comparative Example 1. The results are shown in Table 2.

Reference Example 1

A low molecular weight PTFE powder was obtained by emulsion polymerization in the presence of a chain-transfer agent in accordance with Example 2 of WO 2009/020187. For the resulting low molecular weight PTFE powder, the number of carboxyl end groups was counted by infrared spectroscopy to be 7 groups per $10^6$ carbon atoms in the main chain.

Reference Example 2

A low molecular weight PTFE powder was obtained by emulsion polymerization in the presence of a chain-transfer agent in accordance with Preparation Example 2 of JP H08-339809 A, except that the amount of ethane added as a chain-transfer agent was changed to 0.22 g. For the resulting low molecular weight PTFE powder, the number of carboxyl end groups was counted by infrared spectroscopy to be 15 groups per $10^6$ carbon atoms in the main chain.

Comparative Example 6

Commercially available homo-PTFE fine powder (standard specific gravity measured in conformity with ASTM D4895: 2.175) was irradiated with 300 kGy of cobalt-60 γ-rays at room temperature in the air. Thereby, a low molecular weight PTFE powder M having an average particle size of 31.6 μm was obtained.

The physical properties of the resulting low molecular weight PTFE powder M were determined. The results are shown in Table 3.

For the low molecular weight PTFE powder M, the number of carboxyl end groups was counted by infrared spectroscopy to be 74 groups per $10^6$ carbon atoms in the main chain.

Comparative Example 7

The low molecular weight PTFE powder M obtained in Comparative Example 6 was pulverized using a pulverizer. Thereby, a low molecular weight PTFE powder N having an average particle size of 5.7 μm was obtained.

The physical properties were determined in the same manner as in Comparative Example 6. The results are shown in Table 3.

Comparative Example 8

The low molecular weight PTFE powder M obtained in Comparative Example 6 was heated at 100° C. for 30 minutes using a hot-air-circulating electric furnace (Ultra-high temperature chamber STPH-202M, Espec Corp.). Thereby, a low molecular weight PTFE powder O was obtained.

The physical properties were determined in the same manner as in Comparative Example 6. The results are shown in Table 3.

Comparative Example 9

The low molecular weight PTFE powder O obtained in Comparative Example 8 was pulverized using a pulverizer. Thereby, a low molecular weight PTFE powder P was obtained.

The physical properties were determined in the same manner as in Comparative Example 6. The results are shown in Table 3.

Example 8

The low molecular weight PTFE powder N obtained in Comparative Example 7 was heated at 100° C. for 30 minutes using a hot-air-circulating electric furnace (Ultra-high temperature chamber STPH-202M, Espec Corp.). Thereby, a low molecular weight PTFE powder Q was obtained.

The physical properties were determined in the same manner as in Comparative Example 6. The results are shown in Table 3.

Example 9

The low molecular weight PTFE powder Q obtained in Example 8 was further pulverized using a pulverizer. Thereby, a low molecular weight PTFE powder R was obtained.

The physical properties were determined in the same manner as in Comparative Example 6. The results are shown in Table 3.

Comparative Example 10

A modified PTFE fine powder (amount of modification: 0.3%) (standard specific gravity measured in conformity with ASTM D4895: 2.170) was irradiated with 150 kGy of cobalt-60 γ-rays at room temperature in the air. Thereby, a low molecular weight PTFE powder S having an average particle size of 48.8 µm was obtained.

The physical properties of the resulting low molecular weight PTFE powder S were determined. The results are shown in Table 4.

For the low molecular weight PTFE powder S, the number of carboxyl end groups was counted by infrared spectroscopy to be 46 groups per $10^6$ carbon atoms in the main chain.

Comparative Example 11

The low molecular weight PTFE powder S obtained in Comparative Example 10 was pulverized using a pulverizer. Thereby, a low molecular weight PTFE powder T having an average particle size of 10.8 µm was obtained.

The physical properties were determined in the same manner as in Comparative Example 10. The results are shown in Table 4.

Comparative Example 12

The low molecular weight PTFE powder S obtained in Comparative Example 10 was heated at 100° C. for 30 minutes using a hot-air-circulating electric furnace (Ultra-high temperature chamber STPH-202M, Espec Corp.). Thereby, a low molecular weight PTFE powder U was obtained.

The physical properties were determined in the same manner as in Comparative Example 10. The results are shown in Table 4.

Comparative Example 13

The low molecular weight PTFE powder U obtained in Comparative Example 12 was pulverized using a pulverizer. Thereby, a low molecular weight PTFE powder V was obtained.

The physical properties were determined in the same manner as in Comparative Example 10. The results are shown in Table 4.

Example 10

The low molecular weight PTFE powder T obtained in Comparative Example 11 was heated at 100° C. for 30 minutes using a hot-air-circulating electric furnace (Ultra-high temperature chamber STPH-202M, Espec Corp.). Thereby, a low molecular weight PTFE powder W was obtained.

The physical properties were determined in the same manner as in Comparative Example 10. The results are shown in Table 4.

Example 11

The low molecular weight PTFE powder W obtained in Example 10 was further pulverized using a pulverizer. Thereby, a low molecular weight PTFE powder X was obtained.

The physical properties were determined in the same manner as in Comparative Example 10. The results are shown in Table 4.

TABLE 1

| | Low molecular weight PTFE powder | Irradiation conditions | | | Treatment | | Amount of PFOA (ppb) | Amount of PFC (ppb) | Average particle size (µm) | Melt viscosity (Pa·s) | Carboxy groups (N) |
|---|---|---|---|---|---|---|---|---|---|---|---|
| | | Temperature | Atmosphere | Dose | after irradiation | Heating conditions | | | | | |
| Comparative Example 1 | A | Room temperature | Air | 150 kGy | — | — | 61 | 137 | 51.2 | $5.6 \times 10^4$ | 36 |
| Comparative Example 2 | B | Room temperature | Air | 150 kGy | Pulverization | — | 92 | 255 | 11.2 | $5.5 \times 10^4$ | 36 |
| Comparative Example 3 | C | Room temperature | Air | 150 kGy | Heating | 100° C./30 min | <5 | <5 | 81.3 | $6.1 \times 10^4$ | 36 |
| Comparative Example 4 | D | Room temperature | Air | 150 kGy | Heating, followed by pulverization | 100° C./30 min | 34 | 65 | 6.7 | $5.7 \times 10^4$ | 36 |
| Example 1 | E | Room temperature | Air | 150 kGy | Pulverization, followed by heating | 100° C./30 min | <5 | <5 | 17.7 | $5.6 \times 10^4$ | 36 |
| Example 2 | F | Room temperature | Air | 150 kGy | Pulverization, followed by heating, followed by further pulverization | 100° C./30 min | <5 | <5 | 3.9 | $5.6 \times 10^4$ | 36 |

TABLE 2

| | Low molecular weight PTFE powder | Heating temperature | Heating duration | Amount of PFOA (ppb) | Amount of PFC (ppb) | Average particle size (μm) | Specific surface area (m²/g) | Melt viscosity (Pa·s) |
|---|---|---|---|---|---|---|---|---|
| Comparative Example 5 | G | — | — | 249 | 644 | 2.2 | 8.9 | 3.5 × 10⁴ |
| Example 3 | H | 100° C. | 3 hr | <5 | <5 | 2.7 | 9.0 | 4.5 × 10⁴ |
| Example 4 | I | 150° C. | 3 hr | <5 | <5 | 2.5 | 9.0 | 4.5 × 10⁴ |
| Example 5 | J | 200° C. | 3 hr | <5 | <5 | 2.5 | 9.0 | 4.7 × 10⁴ |
| Example 6 | K | 250° C. | 3 hr | <5 | <5 | 3.2 | 5.6 | 4.7 × 10⁴ |
| Example 7 | L | 300° C. | 3 hr | <5 | <5 | 5.1 | 6.4 | 5.0 × 10⁴ |

TABLE 3

| | Low molecular weight PTFE powder | Irradiation conditions | | | Treatment after irradiation | Heating conditions | Amount of PFOA (ppb) | Amount of PFC (ppb) | Average particle size (μm) | Melt viscosity (Pa·s) | Carboxy groups (N) |
|---|---|---|---|---|---|---|---|---|---|---|---|
| | | Temperature | Atmosphere | Dose | | | | | | | |
| Comparative Example 6 | M | Room temperature | Air | 300 kGy | — | — | 159 | 338 | 31.6 | 1.6 × 10⁴ | 74 |
| Comparative Example 7 | N | Room temperature | Air | 300 kGy | Pulverization | — | 197 | 426 | 5.7 | 1.4 × 10⁴ | 74 |
| Comparative Example 8 | O | Room temperature | Air | 300 kGy | Heating | 100° C./30 min | <5 | <5 | 69.8 | 1.6 × 10⁴ | 74 |
| Comparative Example 9 | P | Room temperature | Air | 300 kGy | Heating, followed by pulverization | 100° C./30 min | 42 | 78 | 3.6 | 1.4 × 10⁴ | 74 |
| Example 8 | Q | Room temperature | Air | 300 kGy | Pulverization, followed by heating | 100° C./30 min | <5 | <5 | 15.7 | 1.4 × 10⁴ | 74 |
| Example 9 | R | Room temperature | Air | 300 kGy | Pulverization, followed by heating, followed by further pulverization | 100° C./30 min | <5 | <5 | 3.2 | 1.4 × 10⁴ | 74 |

TABLE 4

| | Low molecular weight PTFE powder | Irradiation conditions | | | Treatment after irradiation | Heating conditions | Amount of PFOA (ppb) | Amount of PFC (ppb) | Average particle size (μm) | Melt viscosity (Pa·s) | Carboxy groups (N) |
|---|---|---|---|---|---|---|---|---|---|---|---|
| | | Temperature | Atmosphere | Dose | | | | | | | |
| Comparative Example 10 | S | Room temperature | Air | 150 kGy | — | — | 85 | 191 | 48.8 | 4.8 × 10⁴ | 46 |
| Comparative Example 11 | T | Room temperature | Air | 150 kGy | Pulverization | — | 125 | 346 | 10.8 | 4.7 × 10⁴ | 46 |
| Comparative Example 12 | U | Room temperature | Air | 150 kGy | Heating | 100° C./30 min | <5 | <5 | 95.4 | 5.5 × 10⁴ | 46 |
| Comparative Example 13 | V | Room temperature | Air | 150 kGy | Heating, followed by pulverization | 100° C./30 min | 46 | 89 | 5.8 | 5.0 × 10⁴ | 46 |
| Example 10 | W | Room temperature | Air | 150 kGy | Pulverization, followed by heating | 100° C./30 min | <5 | <5 | 20.1 | 4.6 × 10⁴ | 46 |

TABLE 4-continued

| | Low molecular weight PTFE powder | Irradiation conditions | | | Treatment after irradiation | Heating conditions | Amount of PFOA (ppb) | Amount of PFC (ppb) | Average particle size (μm) | Melt viscosity (Pa · s) | Carboxy groups (N) |
|---|---|---|---|---|---|---|---|---|---|---|---|
| | | Temperature | Atmosphere | Dose | | | | | | | |
| Example 11 | X | Room temperature | Air | 150 kGy | Pulverization, followed by heating, followed by further pulverization | 100° C./ 30 min | <5 | <5 | 4.4 | $4.4 \times 10^4$ | 46 |

The abbreviations in the tables represent as follows.
PFC: C8-C14 perfluorocarboxylic acids and salts thereof
PFOA: perfluorooctanoic acid and salts thereof

The invention claimed is:

1. A method for producing low molecular weight polytetrafluoroethylene, comprising:
   (1) irradiating polytetrafluoroethylene at a dose of 10-750 kGy to provide low molecular weight polytetrafluoroethylene having a melt viscosity of $1 \times 10^2$ to $7 \times 10^5$ Pa·s at 380° C.;
   (2) pulverizing the low molecular weight polytetrafluoroethylene;
   (3) heating the low molecular weight polytetrafluoroethylene pulverized in the step (2), wherein the heating is performed at a temperature of 100° C. to 300° C. for 10 minutes to 5 hours; and
   (4) heating the polytetrafluoroethylene up to a temperature that is not lower than the primary melting point thereof to provide a molded article before the step (1), wherein the molded article has a specific gravity of 1.0 g/cm$^3$ or higher, and the molded article is used as the polytetrafluoroethylene in the step (1).

2. The production method according to claim 1, wherein the heating is performed at a temperature of 100° C. to 200° C.

3. The production method according to claim 1, wherein the polytetrafluoroethylene has a standard specific gravity of 2.130 to 2.230.

4. The production method according to claim 1, wherein both the polytetrafluoroethylene and the low molecular weight polytetrafluoroethylene are in the form of powder.

* * * * *